Aug. 26, 1947.   C. S. BATCHELOR   2,426,294
METHOD OF TREATING FRICTION MATERIAL
Filed Dec. 22, 1943   2 Sheets-Sheet 1

Inventor:
Clyde S. Batchelor
By: Lee J. Gary
Attorney

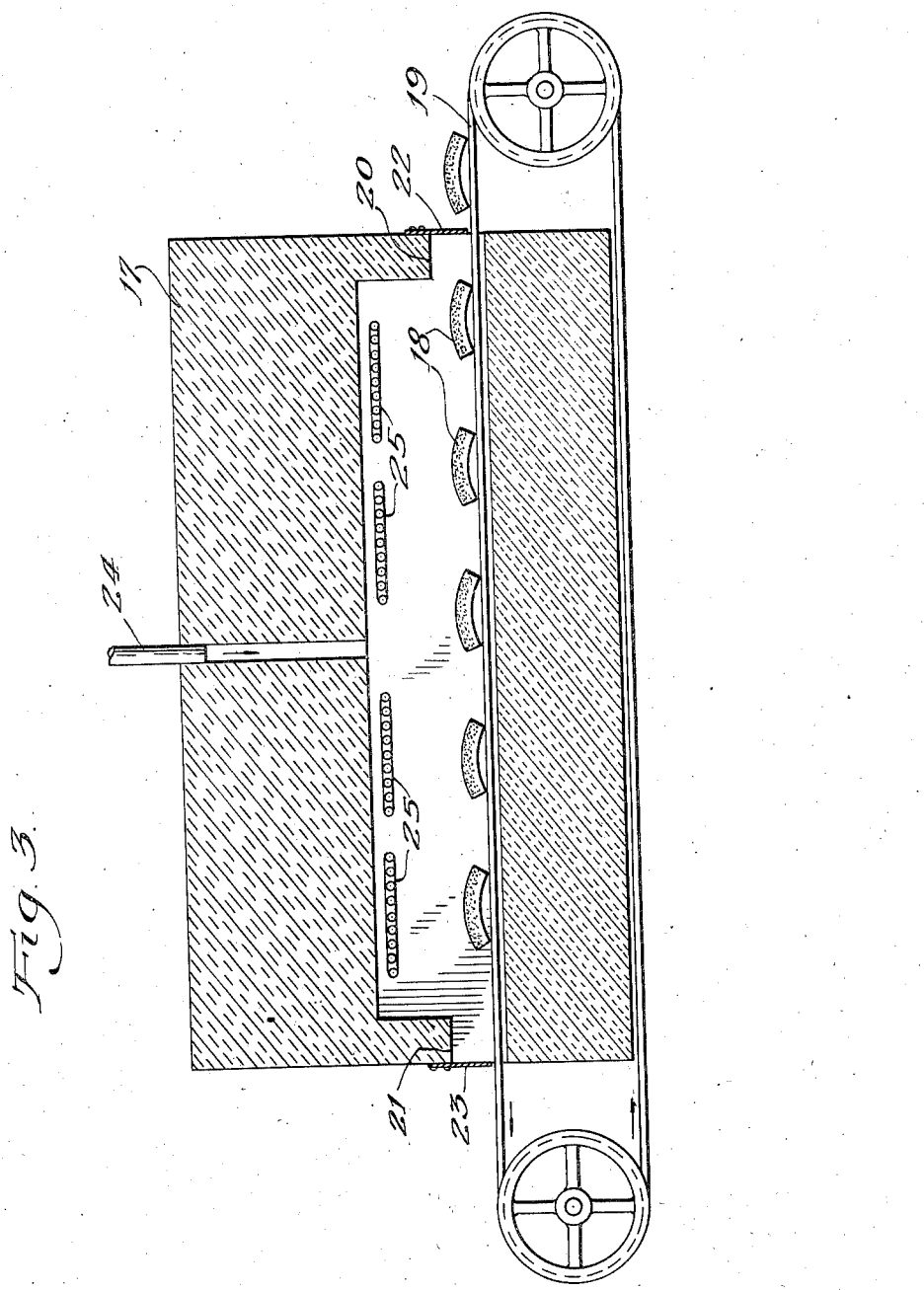

Patented Aug. 26, 1947

2,426,294

UNITED STATES PATENT OFFICE 2,426,294

METHOD OF TREATING FRICTION MATERIAL

Clyde S. Batchelor, Bridgeport, Conn., assignor to Raybestos-Manhattan, Inc., Passaic, N. J., a corporation of New Jersey Application December 22, 1943, Serial No. 515,325

11 Claims. (Cl. 117—65)

This invention relates to improvements in the production of friction materials such as brake linings, brake blocks, clutch facings and the like, friction or tractive surfaced bodies composed essentially of asbestos fibers in either woven, felted or molded form and bonded together with an organic binder such as a rubber, synthetic resin, or drying oil in cured or heat hardened condition.

One of the greatest difficulties encountered in the use of such friction materials, and particularly with friction elements such as brake linings or brake blocks which must be designed for high durability, is that the severe demands on the friction materials, particularly under high speed or heavy load requirements subjects them, at least during their early or initial periods of usage, to what is known as "fading."

Fading may be defined as softening of the binder in the friction lining under heat, with a slippage of the brake, due to the lubricating effect of the softened binder, which effect is also accompanied by blistering of the lining, due to decomposition, and partial volatilization or fractional distillation of the binder or organic matter in the lining under frictional heat. This condition is well recognized in the progressively severe demands being placed on the friction elements employed in automotive vehicles, and is of critical importance in the design of high speed or heavy vehicles, such as heavy duty trucks and buses where brake linings operate at high temperatures, and at the present time is an important problem to the air craft industry where tremendous energy is absorbed in an extremely short time.

Considerable attention has been given to the suppression, reduction or elimination of fade by the prior art, the most common approaches being an increase in the curing time or temperature or both in the initial production of the friction material, and some appreciable gains can often be made by such approach. However, as the severity of the cure or heat treatment increases an optimum is always reached and thereafter the friction element or brake lining wears rapidly and often times fade is even increased and it has never been found possible to entirely eliminate fade by a cure of the binder.

Other expedients which have been resorted to are flame treatment of the wearing surface, radiant heat from high temperature sources and induction heating. These methods do produce some changes in the fading characteristics but either fail to eliminate the fade satisfactorily or oxidize the lining so thoroughly that the bond is weakened and the friction material as a result disintegrates rapidly in service.

Two other methods may be mentioned which while reasonably effective in the substantial elimination of fade are highly undesirable from a commercial production standpoint. The first of these is burnishing the lining prior to its final installation, which consists in the case of brake linings of attaching the linings to the regular shoes or their equivalent and rubbing the friction surface at a pressure in such a manner as to simulate its intended service. When carefully controlled this method is fairly effective but on the other hand is extremely expensive and the distillates produced are undesirable features. In addition, the cooperating working surface metals rapidly become scored and heat-checked, necessitating frequent substituting of new mating surfaces.

The other method which is the most common approach to the problem is either to drag the brakes immediately after installation for a predetermined length of time or to make a series of stops from the correct speeds to properly condition the lining. In addition to being subjected to some of the difficulties aforementioned, the operation requires great skill and specially trained personnel and in the case of the aeronautical industry this is virtually impossible, due to congestion of fields and lack of trained men with available time, and the hazards and inaccuracies involved.

It is therefore an object of my invention to provide friction material, freed or substantially freed of tendency to fade upon initial use and to provide friction elements such as brake linings and the like which are already broken in as far as the fade characteristic is concerned, prior to installation, by subjecting friction elements, which have been already formed in well known conventional manner and with their organic binders fully or substantially fully cured, to specific and controlled heat treatment.

Thus in accordance with the present invention I have discovered that if heat is applied to the operative surface of a friction element under non-oxidizing conditions, that fade may be readily eliminated. The temperatures which I apply to the operative surface of the friction element are of far greater order than any used in the conventional heat treatment or cure thereof. In conventional cures temperatures of greater than 600° F., are rarely used and the usual cure treatment temperatures are from about 300 to about 500° F.

In accordance with the present invention I have found that when the friction surface is heated to a temperature of from about 700 to about 2000° F., for brief periods of time, volatilization or distillation of the low boiling constituents of the heretofore mentioned conventional organic binders takes place. These break-down or low boiling volatilizable binder fractions or constituents which distil off at temperatures approximating those developed under the high heat of frictional usage have been determined to be the cause of the undesirable characteristic of fade.

Various specific means may be employed for carrying out the process of my invention and for producing the resultant improved product, and for the purpose of illustration and not limitation, several such means are described in the following specification and accompanying drawings, wherein:

Fig. 1 diagrammatically illustrates a transverse sectional view of an arrangement of apparatus wherein a friction lining is held against a drum, the surface of the friction element being heated through an interposed confining band.

Fig. 3 is a diagrammatic illustration of a heat treatment furnace in vertical section illustrating another method for treating friction elements such as brake blocks to provide non-fading friction material.

Figure 1:
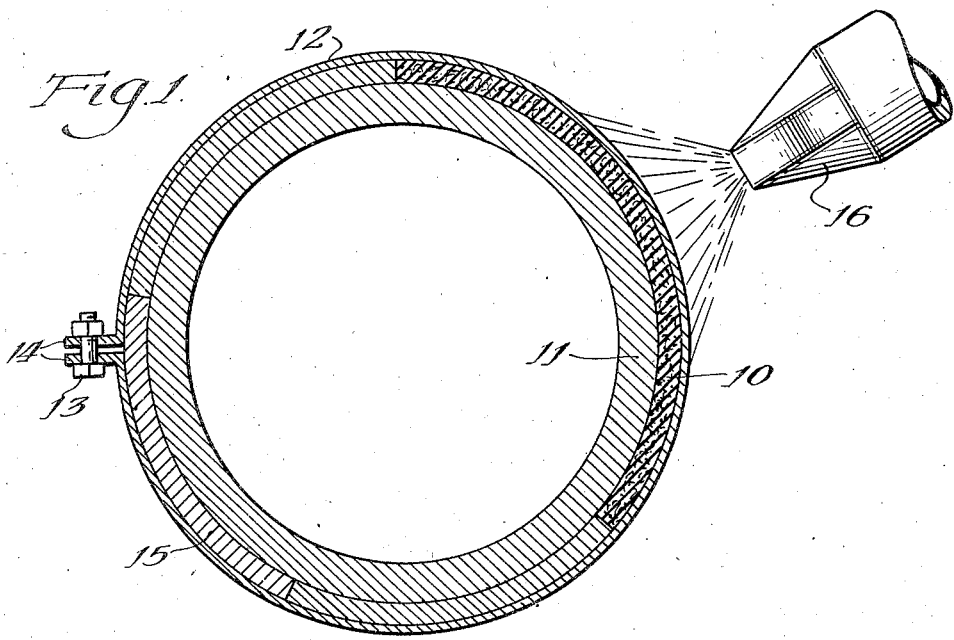
Figure 2:
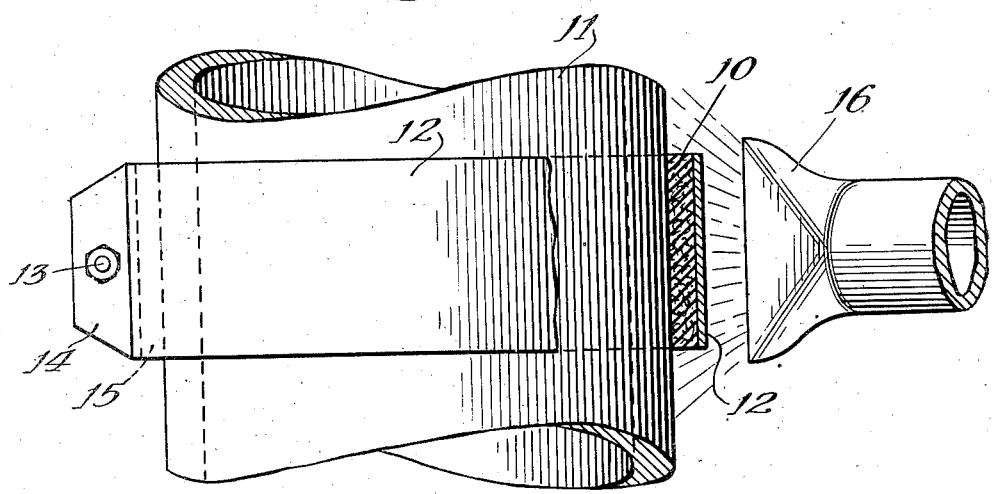
Fig. 2 is a fragmentary plan view with parts broken away of the arrangement illustrated in Fig. 1.

Referring to the drawings, the method and arrangement of treatment means illustrated by Figs. 1 and 2, comprises the laying of an organic binder bonded brake element or lining 10 on a drum 11, whose outside radius is the same as the inside radius of the brake lining. A steel strip or band 12, having a width equal to or greater than that of the lining, is then wrapped around the entire friction or operative surface of the lining and pulled tight by, for example, the bolt 13 extending through the terminal ears 14 of the band 12. Several segments such as those indicated at 15 are additionally placed underneath the band to make up approximately 360°. These added segments 15 may be blank fillers or may be additional friction elements. The surface of the brake lining is then heated, through band 12, by a flame emitted from the fish tail burner 16 projected against the steel band 12. In an arrangement such as illustrated the steel surface of band 12 should be heated to a dull red (approximately 1400° F.). The time and temperature of application is dependent on the properties desired and can be determined in each case by properly correlated test program. After heating the lining for some seconds smoke develops at the edges of the heating zone, that is, at the lateral edges of the brake lining and enveloping band, and becomes profuse as the heating continues.

In the case of a brake lining wherein the binder is a synthetic resin such as a resin of the phenolaldehyde type, the smoke consists of the lighter ends of the resin which may be readily condensed by placing a cold metal collecting surface, not illustrated, adjacent to the lateral edges of the band 12, in contact with the smoke, the condensate being a gummy fraction.

When brake linings are heated in this manner the resin or other organic binder becomes progressively distilled, distillation being greatest at the surface and tapering down in the direction of the thickness of the element, to a point where no distillate occurs if the time cycle is properly adjusted. This control method differs from the direct flame method in that no burning occurs due to the fact that the operation has been carried out under non-oxidizing conditions, the wear surface and the rear surface having been completely excluded from air during treatment with only the ends having been exposed to the atmosphere but here substantially no oxidizing effect likewise occurs due to the pressure of the volatilizing or low boiling and break down constituents. The heating may be made to consist of several cycles of heating, for example, the heat may be applied for three consecutive heats with a brief cool-down period between the applications. Likewise if desired, although not illustrated, the band 12 may be heated by induction heating or by resistance heating. It will likewise be understood that the drum 11 may be of any desired length and that a plurality of spaced bands 12 may be employed for simultaneous treatment of a plurality of similar friction elements or brake linings 10 either by means of the indicated electrical heat treatment methods or the employment of a plurality of torches with suitable burners for flame heat treatment.

The diagrammatic illustration of Fig. 3 comprises a heat treatment furnace formed of suitable insulation material 17 through which friction elements or brake blocks 18 are conveyed by means of the conveyor belt 19. The furnace is provided with an inlet opening 20 and an outlet opening 21 only wide enough to allow passage of the friction material to be treated, these openings being partially sealed by flap seals or flame curtains 22 and 23 respectively. The furnace is provided with an inlet conduit 24 for admission of an inert gas such as a cracked hydrocarbon gas, flue gas or other gas inert with respect to the component materials of the friction element being treated, and of a non-oxidizing nature. This gas is admitted to the chamber of the furnace in such quantity as to prevent appreciable oxidation of the friction material or blocks, and the furnace is further provided with heating elements 25 situated in close proximity to the operative surface of the blocks as they travel on the conveyor belt 19 so that the blocks may be mainly heated by radiation in the direction of their surfaces.

The fading cure of the surface of the brake blocks 18 may be controlled by the speed of the conveyor belt and the temperature and distance of the work from the heat source 25, which may be resistance heating elements. As indicated the fade elimination heat treatment of the surface of the brake blocks 18 is carried out by placing them on the conveyor belt 19 with their wear or operative surfaces uppermost, and carried into the furnace in that manner so as to cause the wear surface to come in contact with the heat from the heating elements. The friction material due to the close proximity thereof to the heating elements is heated to only a small degree by conduction and convection and the operative surface is heated much more rapidly than the body of the block. As the block progresses along the conveyor belt, the surface and surface adjacent portions reach the distillation point of the binder and some of the lower melting or volatilizable break down constituents pass off as distillate. Oxidation is prevented by introducing the inert non-oxidizing gas which is being introduced into the furnace from the conduit 24 at a rate sufficient to create a positive pressure and to prevent air from entering the furnace 17.

As indicated the conveyor belt speed and the temperature of the heating elements 25 may be so regulated that when the block arrives at the exit 21 of the furnace, the surface of the block has been conditioned to the desired depth to a progressive degree in the direction of its thickness, greatest distillation having been caused to have occurred at the wear surface of the element with a minimum or substantially no volatilization of binder at the opposed attachment surface of the element or block.

It will be understood that various other modifications will occur to those skilled in the art for the heat treatment of brake blocks and linings and friction materials in general, in addition to diagrammatic arrangements of apparatus herein shown and described, for the purpose of accommodating friction elements of various shape and contour and by some of the alternative methods and means hereinbefore briefly mentioned.

It will be understood that my method is adapted for the treatment of pre-formed friction elements wherein their organic binders of the class previously indicated and conventionally employed have been fully cured, such as by heat hardening and vulcanization of natural and synthetic rubber binders, cure of thermo-setting synthetic resins of the phenol-aldehyde type, and oxidation and/or polymerization of oils of the drying type, and wherein the binder carriers or solvents have already been substantially distilled off in the binder cure treatment.

I claim as my invention:

1. The method of stabilizing friction material containing a cured organic binder to substantially eliminate fading tendency thereof on initial use which consists in pre-treating said friction material in formed condition prior to operative use by directing heat from an external source against the operative surface thereof, while confining it in a relatively inert atmosphere, to partially volatilize the binder content at and adjacent to said operative surface.

2. The method of stabilizing friction material composed essentially of fibrous asbestos and a heat hardenable organic binder in hardened condition to substantially eliminate fading tendency thereof on initial use which consists in pre-treating said friction material in formed condition prior to operative use by directing heat from an external source against the operative surface thereof at a temperature higher than that at which said binder was cured, while confining it in a relatively inert atmosphere, to partially volatilize the binder content at and adjacent to said operative surface.

3. The method of forming improved friction material of stabilized character which consists in heating the operative surface of newly formed friction material containing an organic binder in substantially cured condition, by directing thereto heat from an externally generated source and prior to initial operative use thereof, at a temperature of about 700 to about 2000° F., in an inert atmosphere to partially distil off the binder at and adjacent to its operative surface.

4. The method of forming improved pre-conditioned and stabilized friction material which consists in subjecting friction material containing an organic binder in cured condition to heat at a temperature of from about 700 to about 2000° F., directed against the operative surface thereof from an external source, while retaining said surface in a relatively inert atmosphere, to partially distil off binder components volatilizable at said temperature and in greatest proportion at and adjacent to said operative surface, prior to operative use thereof.

5. The method of stabilizing friction material containing a cured rubber binder to substantially eliminate fading tendency thereof on initial use which consists in pre-treating said friction material in formed condition prior to operative use by directing heat from an external source against the operative surface thereof, while confining it in a relatively inert atmosphere, to partially volatilize the binder content at and adjacent to said operative surface.

6. The method of stabilizing friction material containing a cured drying oil binder to substantially eliminate fading tendency thereof on initial use which consists in pre-treating said friction material in formed condition prior to operative use by directing heat from an external source against the operative surface thereof, while confining it in a relatively inert atmosphere, to partially volatilize the binder content at and adjacent to said operative surface.

7. The method of stabilizing friction material containing a cured phenolic binder to substantially eliminate fading tendency thereof on initial use which consists in pre-treating said friction material in formed condition prior to operative use by directing heat from an external source use by directing heat from an external source against the operative surface thereof, while confining it in a relatively inert atmosphere, to partially volatilize the binder content at and adjacent to said operative surface.

8. The method of stabilizing friction material containing a cured organic binder to substantially eliminate fading tendency thereof on initial use which consists in pre-treating said friction material in formed condition prior to operative use thereof by directing heat from an external source against the operative surface thereof, through a metallic shield tightly conformed thereto and confining it in a relatively inert atmosphere, to partially volatilize the binder content at and adjacent to said operative surface.

9. The method of stabilizing friction material containing a cured organic binder to substantially eliminate fading tendency thereof on initial use which consists in pre-treating said friction material in formed condition prior to operative use thereof by directing heat from an electrical source against the operative surface thereof, through a metallic electrical resistance shield tightly conformed thereto and confining it in a relatively inert atmosphere, to partially volatilize the binder content at and adjacent to said operative surface.

10. The method of stabilizing friction material containing a cured organic binder to substantially eliminate fading tendency thereof on initial use which consists in pre-treating said friction material in formed condition prior to operative use thereof by directing heat from an external source against the operative surface thereof, while confined between a pair of endwise open tightly surface conforming and embracing opposed members confining it in a relatively inert atmosphere, to partially volatilize the binder content at and adjacent to said operative surface.

11. The method of stabilizing friction material containing a cured organic binder to substantially eliminate fading tendency thereof on initial use which consists in pre-treating said friction material in formed condition prior to operative use thereof by directing essentially radiant heat from an external source against the operative surface thereof while maintaining it in a relatively confined zone provided with a relatively inert atmosphere, to partially volatilize the binder content at and adjacent to said operative surface.

CLYDE S. BATCHELOR.

REFERENCES CITED

The following references are of record in the file of this patent:

UNITED STATES PATENTS

| Number | Name | Date |
|---|---|---|
| 1,761,057 | Thompson | June 3, 1930 |
| 1,971,618 | Norton | Aug. 28, 1934 |
| 2,267,803 | Spokes | Dec. 30, 1941 |